(12) United States Patent
Keller et al.

(10) Patent No.: US 11,339,097 B2
(45) Date of Patent: May 24, 2022

(54) REFRACTORY METAL SILICIDE NANOPARTICLE CERAMICS

(71) Applicant: The Government of the United States of America, as represented by the Secretary of the Navy, Arlington, VA (US)

(72) Inventors: Teddy M. Keller, Fairfax Station, VA (US); Matthew Laskoski, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 147 days.

(21) Appl. No.: 16/216,279

(22) Filed: Dec. 11, 2018

(65) Prior Publication Data

US 2019/0119168 A1 Apr. 25, 2019

Related U.S. Application Data

(62) Division of application No. 15/585,444, filed on May 3, 2017, now Pat. No. 10,189,747.

(Continued)

(51) Int. Cl.
*C04B 35/00* (2006.01)
*C04B 35/58* (2006.01)
(Continued)

(52) U.S. Cl.
CPC ........ *C04B 35/58092* (2013.01); *C04B 35/52* (2013.01); *C04B 35/573* (2013.01); *C04B 35/6261* (2013.01); *C04B 35/65* (2013.01); *C04B 35/78* (2013.01); *C04B 2235/3232* (2013.01); *C04B 2235/3239* (2013.01); *C04B 2235/3244* (2013.01); *C04B 2235/3251* (2013.01); *C04B 2235/3256* (2013.01); *C04B 2235/3258* (2013.01); *C04B 2235/3826* (2013.01); *C04B 2235/3839* (2013.01); *C04B 2235/3843* (2013.01); *C04B 2235/3886* (2013.01); *C04B 2235/3891* (2013.01); *C04B 2235/422* (2013.01); *C04B 2235/428* (2013.01);

(Continued)

(58) Field of Classification Search
None
See application file for complete search history.

(56) References Cited

U.S. PATENT DOCUMENTS 4,818,734 A * 4/1989 Kanter ................. C04B 35/652
 264/332
5,135,782 A * 8/1992 Rostoker ................ C23C 10/22
 427/431

(Continued)

*Primary Examiner* — Stefanie J Cohen
(74) *Attorney, Agent, or Firm* — US Naval Research Laboratory; Joseph Grunkemeyer (57) ABSTRACT

Particles of a refractory metal or a refractory-metal compound capable of decomposing or reacting into refractory-metal nanoparticles, elemental silicon, and an organic compound having a char yield of at least 60% by weight are combined to form a precursor mixture. The mixture is heating, forming a thermoset and/or metal nanoparticles. Further heating form a composition having nanoparticles of a refractory-metal silicide and a carbonaceous matrix. The composition is not in the form of a powder

19 Claims, 6 Drawing Sheets

Related U.S. Application Data (60) Provisional application No. 62/331,069, filed on May 3, 2016.

(51) Int. Cl.
| | | |
|---|---|---|
| *C04B 35/52* | (2006.01) | |
| *C04B 35/573* | (2006.01) | |
| *C04B 35/78* | (2006.01) | |
| *C04B 35/626* | (2006.01) | |
| *C04B 35/65* | (2006.01) | |

(52) U.S. Cl.
CPC ...... *C04B 2235/44* (2013.01); *C04B 2235/48* (2013.01); *C04B 2235/5436* (2013.01); *C04B 2235/5454* (2013.01); *C04B 2235/602* (2013.01); *C04B 2235/6562* (2013.01); *C04B 2235/6567* (2013.01); *C04B 2235/6586* (2013.01); *C04B 2235/661* (2013.01); *C04B 2235/781* (2013.01); *C04B 2235/95* (2013.01)

(56) References Cited

U.S. PATENT DOCUMENTS

| | | | | |
|---|---|---|---|---|
| 5,468,358 A * | 11/1995 | Ohkawa | ................ | C25D 13/02 |
| | | | | 204/487 |
| 5,554,390 A * | 9/1996 | Anne | ................ | C23C 8/40 |
| | | | | 427/190 |
| 6,110,527 A * | 8/2000 | Brun | ................ | C04B 35/573 |
| | | | | 427/214 |
| 8,822,023 B2 * | 9/2014 | Keller | ................ | C04B 35/522 |
| | | | | 428/220 |

\* cited by examiner

REFRACTORY METAL SILICIDE NANOPARTICLE CERAMICS

This application is a divisional application of U.S. Pat. No. 10,189,747, issued on Jan. 29, 2019, which claims the benefit of U.S. Provisional Application No. 62/331,069, filed on May 3, 2016. The provisional application and all other publications and patent documents referred to throughout this nonprovisional application are incorporated herein by reference.

TECHNICAL FIELD

The present disclosure is generally related to metal silicide ceramics

DESCRIPTION OF RELATED ART

Refractory metal silicides are needed and attractive because of their ultra-high melting temperatures and excellent oxidation resistance. Refractory metal silicide ceramics are some of the highest temperature materials (m. p. >2000° C.) known. Metal silicide thin films are integral parts of all microelectronics devices. For electronic devices, they are typically produced by depositing a metal source on silicon followed by thermal treatments. The refractory metal silicides have been used as ohmic contacts, Schottky barrier contacts, gate electrodes, local interconnects, transistors, and diffusion barriers. With advances in semiconductor device fabrication technology, the shrinkage in linewidth continues at a fast pace. Thus, an improved method for the controlled synthesis of metal silicide nanoparticle compositions is needed. In addition, metal silicides are vacuum deposited as film on high temperature engine components to improve specific properties.

Refractory metal silicides are currently used in numerous high temperature applications including the semiconductor industry, aerospace, and for their catalytic activities in chemical reactions and energy related uses. The disilicides of molybdenum and tungsten were the first to be used in metal-oxide-semiconductor (MOS) devices, which resulted in the rapid development and applications of silicides as gate and interconnects in integrated circuits. Though metal like in their physical properties, silicides are in general brittle at room temperature. Each silicide has its own specific properties for usage in applications under extreme environment conditions. Several metal silicides including $MoSi_2$, $WSi_2$, $TaSi_2$, $TiSi_2$, and $NbSi_2$ have been implemented in various MOS devices and circuits. The low electrical resistance of silicides in combination with high thermal stability, electron-migration resistance, and excellent diffusion barrier characteristics is important for microelectronic applications. Over the past 30 years, metal silicides have been widely used in dense, high-performance, very large scale integration (VLSI) and ultra-large scale integration (ULSI) CMOS integrated circuits. This is due to the fact that the use of silicides allows for the formation of low resistance source, gate, and drain contacts, which can significantly reduce the resistance of a CMOS gate conductor and/or the source/drain series resistance drive current. The lower resistance of the metal silicides contact gives improved device performance in terms of switching speed or source/drain drive current. There is a real need for the development of nanoparticle refractory metal silicides as the minimization of transistors and other electronic components continues to improve speed.

Films, fibers, and powders of these ceramics have not typically been produced in the presence of a support material such as carbon or polymeric precursors. Refractory structural metal silicides are typically prepared by powder metallurgy methods such as hot press sintering. Ordinarily, metal silicide ceramics made by these techniques, which are both energy and time intensive, result in brittle materials, owing partly to the large granular structure and the inconsistently in the metal silicide particle sizes. Refractory metal silicides offer a balance of room, low, intermediate and high (<1400° C.) temperature properties and are candidates to replace Ni based superalloys in future gas turbine engines. The drive toward advanced high thrust-to-weight ratio propulsion systems requires the development of high strength and low-density structural materials capable of extended operation at temperatures as high as 1600° C. Intermetallics such as nickel and titanium aluminides have been extensively studied. These intermediates have melting temperatures of 1400-1600° C., which limits their maximum temperatures to about 1200° C. Intermediate-based compound materials such as Nb and Mo silicides have been combined with metallic second phases in order to generate composites with a combination of attractive low-temperature properties. Niobium silicide-based in situ composites with $Nb_3Si$ and/or $Nb_5Si_3$ silicides have been shown to have great potential because of their attractive balance of high- and low-temperature materials. Molybdenum disilicide ($MoSi_2$) is a high melting point (2030° C.) material with excellent oxidation resistance and a moderate density (6.24 $g/cm^3$), which is used in high temperature furnaces because it can withstand prolonged exposure in air. It is a promising candidate material for high temperature structural applications, particularly in aircraft gas turbine engines. Molybdenum disilicide-based composites have emerged as important elevated temperature structural materials for applications in oxidizing and aggressive environments. Current applications of $MoSi_2$-based composites include turbine airfoils, combustion chamber components in oxidizing environments, missile nozzles, industrial gas burners, diesel engine glow plugs, and materials for glass processing. With its high melting point and excellent high temperature oxidation resistance, $MoSi_2$ is also commonly used as heating elements and can be used for temperatures up to 1800° C. in electric furnaces used in laboratory and production environments in the production of glass, steel, electronics, ceramics and in heat treatment of materials. While the elements are brittle, they can operate at high power without aging, and their electrical resistivity does not increase with operation time.

There is current interest in metal silicides with small particle size and high surface area due to their potential application as catalysts. Refractory metal silicides are used as catalysts due to their oxidative resistance in the generation of hydrogen and/or oxygen with or without light but are more efficient when run under radiation. Thus, they are candidates for fuel cells for the automotive industry. Smaller size particles should be more reactive and more efficient for this application. Hydrogen and oxygen evolution from water using semiconductors and light is an important issue in the exploitation of solar radiation as a sustainable energy. However, a major drawback of most of the research in this field relates to the fact that appropriate semiconductors either are not readily accessible, absorb solar radiation inefficiently, or produce hydrogen while being degraded. A number of the refractory metal silicides are showing promise because of excellent resistance to oxidation at high temperature and high electrical conductivity. The silicides are found to absorb sufficient solar or artificial radiation by themselves without any surface engineering. In addition, the water purity or quality is of minor importance for the oxidation and reduction reaction and storing/absorbing and releasing/desorbing hydrogen and oxygen. The release/desorption of hydrogen and oxygen can occur at ambient temperatures especially the release of hydrogen but is more favorable at elevated temperatures.

Refractory metal silicide ceramic parts, forms, and other shapes can be fabricated from transition metal silicides powders under extremely high pressure and at high temperatures (>2000° C.), a process known as hot press sintering. The powdered metal silicides themselves are synthesized independently from metal particles or metal compounds and silicon or silicon salts. As prepared, the sintered refractory ceramics are brittle due to the granularity of the individual particles sticking together.

BRIEF SUMMARY

Disclosed herein is a composition comprising: nanoparticles comprising a refractory-metal silicide; and a carbonaceous matrix. The composition is not in the form of a powder.

Also disclosed herein is a composition comprising: a metal component, elemental silicon, and an organic component. The metal component is selected from: nanoparticles or particles of a refractory metal; and a refractory-metal compound capable of decomposing into refractory-metal nanoparticles. The organic component is selected from: an organic compound having a char yield of at least 60% by weight; and a thermoset made from the organic compound.

Also disclosed herein is a method comprising: combining particles of a refractory metal or a refractory-metal compound capable of decomposing or reacting into refractory-metal nanoparticles, elemental silicon, and an organic compound having a char yield of at least 60% by weight to form a precursor mixture.

Also disclosed herein is a method comprising: providing a precursor mixture of particles of a refractory metal or a refractory-metal compound capable of decomposing into refractory-metal nanoparticles, elemental silicon, and an organic compound; heating the precursor mixture in an inert atmosphere at an elevated pressure at a temperature that causes decomposition of the refractory-metal compound to form refractory-metal nanoparticles to form a metal nanoparticle composition; and heating the metal nanoparticle composition in an inert atmosphere, argon, nitrogen, or vacuum at a temperature that causes formation of a ceramic comprising nanoparticles of a refractory-metal silicide in a carbonaceous matrix. The organic compound has a char yield of at least 60% by weight when heated at the elevated pressure

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are (1) a method for the in situ formation of nanoparticle refractory metal silicides (Groups IV-VI) namely Ti, Zr, Nb, Mo, Hf, Ta, and W with a trace or a minute quantity of a carbon source from meltable polymer in one step affording a shaped composition with structural integrity, (2) various refractory metal precursor-silicon/thermoset compositions, (3) metal-silicide-metal carbide-silicon carbide nanoparticle compositions at multiple stages, and (4) fiber reinforced metal-silicide and metal silicide-metal carbide-silicon carbide carbon nanoparticle composites. The refractory metal silicides are synthesized in situ in any shape or form desired in one step by thermal means. Moreover, hybrid silicides can also be synthesized by the innovative method involving the uses of more than one refractory metal source in any precursor composition. To improve on the structural integrity and isolation of the metal silicide nanoparticles, a small amount of 1, 2, 4, 5-tetrakis (phenylethynyl) benzene (TPEB) is added to the precursor composition. Many of the materials, methods, and parameters disclosed in U.S. Pat. Nos. 8,822,023; 8,865,301; 8,815,381; and 8,778,488 may be used in the present method, as appropriate.

In the methods disclosed herein, metal compounds and silicon can be combined with a carbon precursor, such as TPEB. Trace to minute quantities of TPEB can be used which will affect the composition of the resulting metal silicide and other ceramic components within the shaped solid ceramic composition. To obtain high yields of metal silicide, a trace amount of the TPEB is preferred to behave as a binder for the nanoparticle metal silicide and to minimize the formation of the metal carbide and/or silicon carbide. The unsaturation (ethynyl groups) of TPEB permits the carbon precursor to undergo conversion from the melt to form thermosets or crosslinked polymers with the metal source and silicon powder embedded homogeneously within the confines of the solid thermoset. To directly obtain a shaped metal silicide ceramic component, the precursor composition is subjected to pressure and/or vacuum and heated to temperatures in excess of 250° C. causing curing of the TPEB and the shaped solid. A typical composition includes the metal compound or multiple metal compounds, silicon powder, and the carbon precursor. Upon heating this composition, the carbon precursor melts at its melting point and is thermally converted to a shaped solid thermoset through reaction of the unsaturated sites. It is possible that during this step the metal compound thermally decomposes into metal nanoparticles, which are embedded in the solid thermoset. Alternatively, the formation of the metal nanoparticles may occur later during the next step in the process, which is extended heat treatment at higher temperatures. Thermal treatment of the thermoset above 500° C. results in carbonization of the carbon precursor and reaction of the metal source and silicon. A trace amount of carbon ensures the formation of mainly refractory metal silicide. However, the amount of metal silicide, metal carbide and silicon carbide within the resulting composition can be varied based on the quantity of each individual component (metal compound, silicon, and melt processable carbon compound) mixed for usage in the precursor composition.

A synthetic method has been developed to produce refractory metal (Ti, W, Nb, Zr, Mo, Cr, V, Ta, and Hf) silicides in shaped solid configurations from metal particle or metal nanoparticles. Mixed phases can also be produced. The metal silicides are produced as nanoparticles in an excess or only a trace amount of carbon precursor. Research shows that when (a) any refractory metal powder or refractory metal compound that decomposes into highly reactive metal particles or metal nanoparticles is combined with (b) silicon powder in either a trace or excess amount of carbon precursor, the combination can be thermally converted to (c) a solid shape containing high yields of pure metal silicides and/or metal silicides and metal nitrides. When the carbon precursor is present in excess, metal silicides, metal carbide, and silicon carbide are also possible as products. The appropriate metal particles or metal nanoparticles can be formed in situ from the thermal decompositions of metal hydrides within the confines of the silicon and carbon precursor. The carbon sources are melt processable aromatic-containing acetylenes or low molecular weight polymers that exhibit extremely high char yields. The carbon precursor contains only C and H to insure that heteroatoms are not incorporated into the interstitial sites of the metal nanoparticles during the reaction to produce the metal carbide and/or metal nitride. The metal silicides or metal nitrides form between 600-1500° C. under inert conditions from reaction of the highly reactive metal particles with either the silicon and/or carbon precursor (degradation above 500° C.) in an atmosphere of argon or nitrogen gas, respectively, but in some cases the reaction can be made to occur faster at higher temperatures. The temperature of choice used will depend on the reactivity of the metal toward silicon. When an excess or trace of the carbon precursor is used, the individual formed metal silicide ceramic nanoparticles are glued or bound together with the resulting nanostructured or amorphous elastic carbon to afford structural integrity. The carbon also isolates the nanoparticle metal silicides to reduce aggregation or agglomeration into larger particle sizes.

Figure 1:
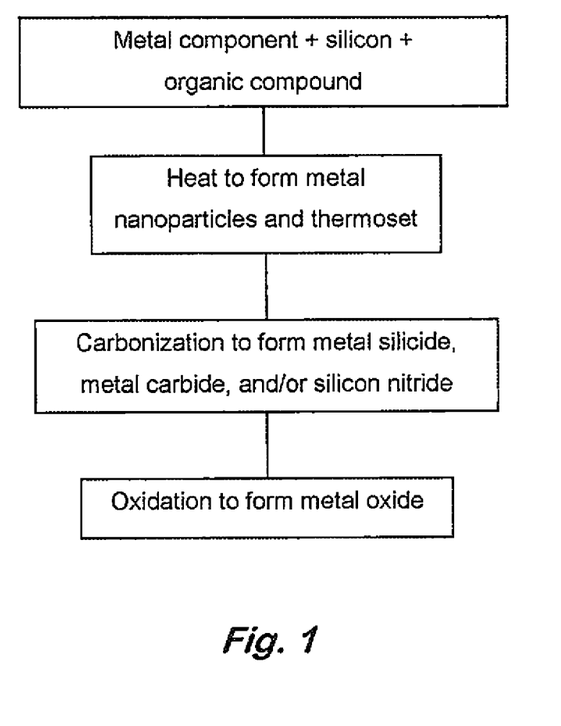
FIG. 1 schematically illustrates a process for forming the disclosed compositions.
Figure 2:
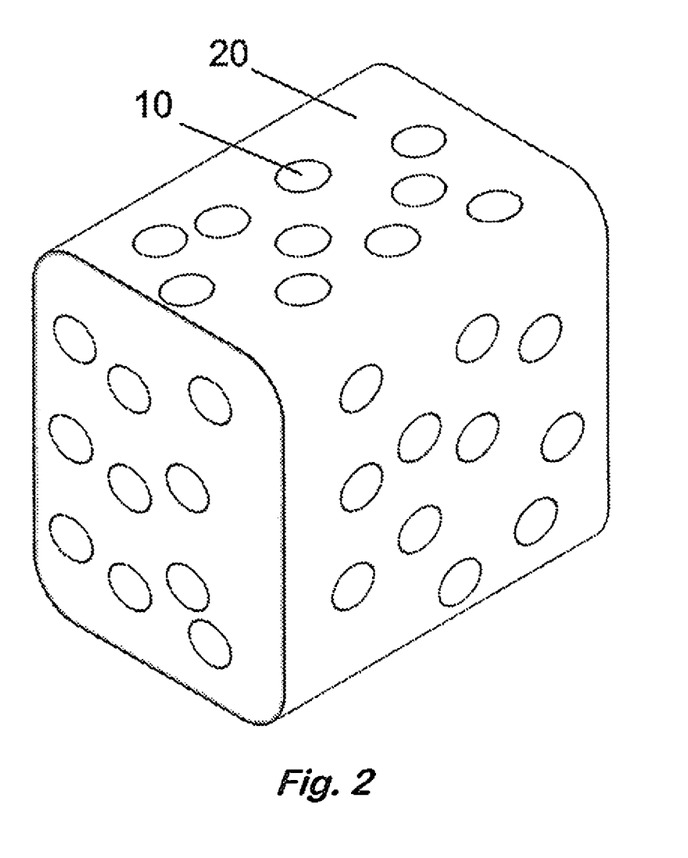
FIG. 2 schematically illustrates metal and silicon particles 10 embedded in a thermoset matrix 20.
Figure 3:
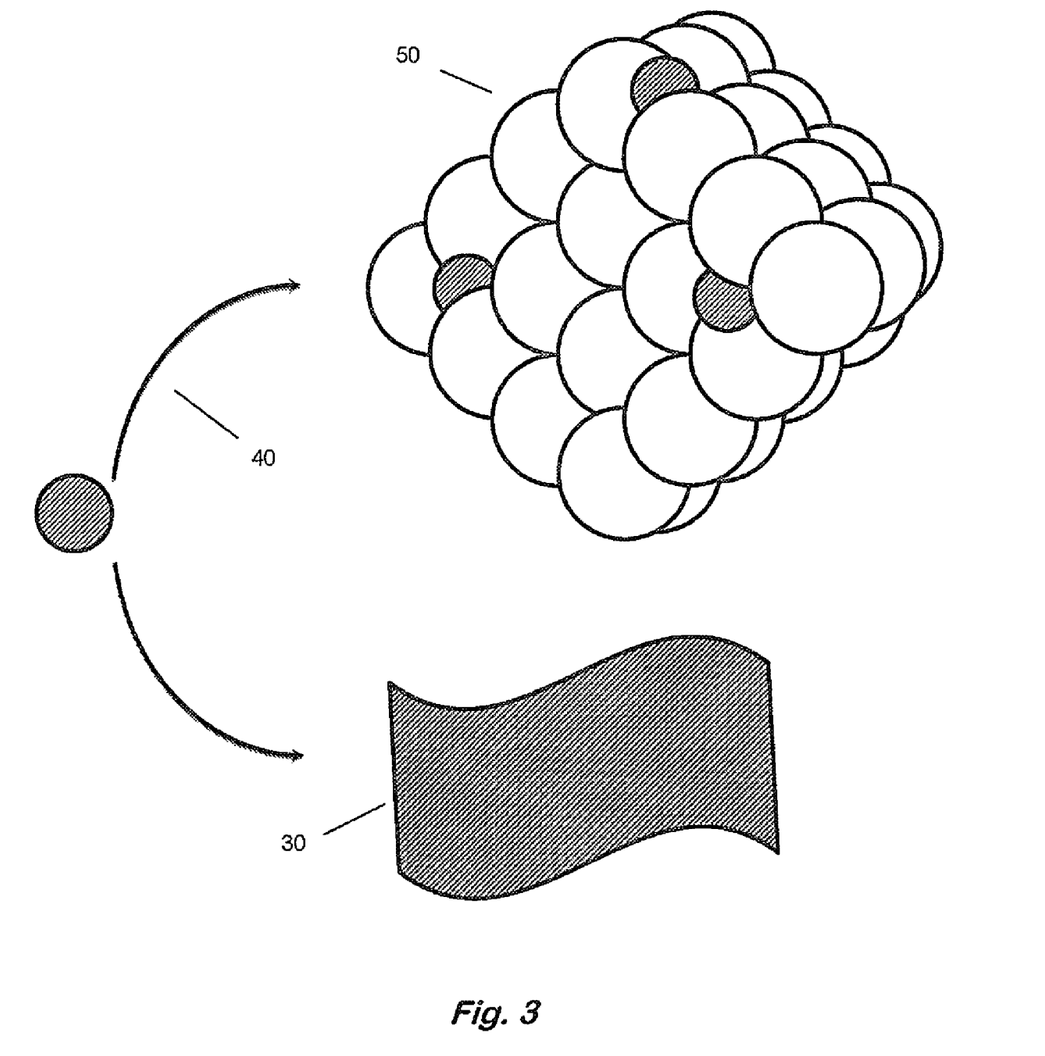
FIG. 3 schematically illustrates the transfer 40 of silicon and carbon atoms from the carbon matrix 30 to the transition metal 50.
Figure 4:
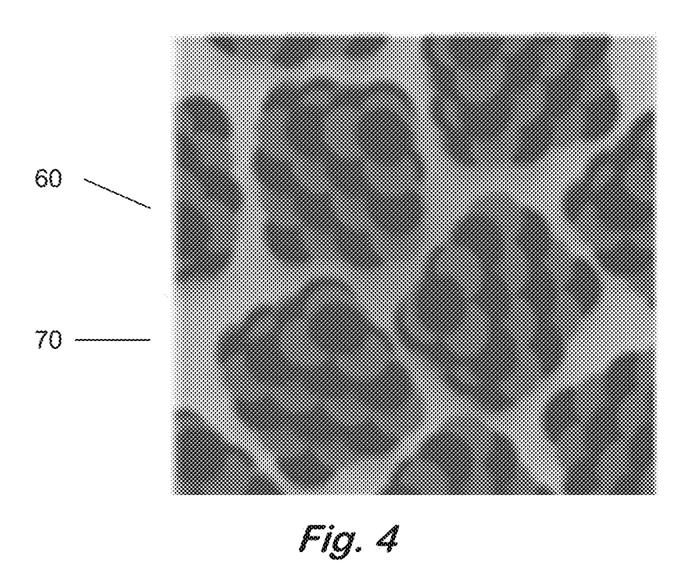
FIG. 4 schematically illustrates metal silicide nanoparticles 60 in a carbonaceous matrix 70.

The process is outlined in FIG. 1 and schematically illustrated in FIGS. 2-4. Any reactions described are not limiting of the presently claimed methods and compositions. It is speculated that the nanoparticle form of the refractory metal activates its reaction with the silicon and carbon source, thereby lowering the temperature of metal silicide formation. Moreover, by varying the amount of metal compound that forms reactive metal nanoparticles relative to the silicon and carbon precursor, the amount of metal silicide, metal carbide, and/or silicon carbide can be changed with respect to the amount of carbon matrix in order to vary the properties of the resulting composition. The amount of metal carbide and/or silicon carbon is dependent on the amount of the carbon precursor present in the original precursor composition. In the case where only a trace amount of carbon precursor is used, metal silicide formation would dominate the ceramic nanoparticle composition in a shaped solid. The metal silicides (trace amount of carbon matrix) or metal silicide, metal carbide, silicon carbide, and/or carbon-matrix compositions are expected to show enhanced toughness, owing to the presence of the relatively elastic carbon even when present in trace amounts, which would exist in forms ranging from amorphous to nanotube to graphitic carbon.

The inclusion of varying amounts of boron into the precursor composition containing a refractory metal source, silicon or silicon-containing materials, and boron in the carbon source material may permit the formation of boride or silicide transition refractory metal ceramics, which are also extremely important in high temperature applications and the semiconductor industry. Such formation of metal borides is disclosed in U.S. Pat. No. 8,865,301.

In the first step of the method, three components are combined and may be thoroughly mixed. The first component is a metal component which may be a refractory-metal compound capable of decomposing into refractory metal nanoparticles or particles of a refractory metal. Any refractory metal may be used, including but not limited to a group IV-VI transition metal, titanium, zirconium, hafnium, tungsten, niobium, molybdenum, chromium, tantalum, or vanadium. More than one metal may be used. When a pure metal is used, it may be in the form of nanoparticles or other particles such as a powder. When such metal particles are used, the metal may directly react with the organic component. Suitable powders include, but are not limited to, tungsten and tantalum.

Instead of pure metal, a compound containing the metal atom may be used. Such compounds decompose at elevated temperatures, releasing the metal atoms so that they may react with the organic component. Suitable such compounds include, but are not limited to, a salt, a hydride, a carbonyl compound, or a halide of the refractory metal. Examples include titanium hydride, zirconium hydride, and hafnium hydride. Other examples and embodiments of types of compounds which may be used with the metals disclosed herein may be disclosed in U.S. Pat. Nos. 6,673,953; 6,770,583; 6,846,345; 6,884,861; 7,722,851; 7,819,938; 8,277,534.

The second component is silicon in elemental form. Suitable silicon is readily available in powder form in >99% purity. The silicon powder may be milled to reduce its particle size. Milling to as small a particle size as possible may improve the final product.

The third component is an organic compound that has a char yield of at least 60% by weight. The char yield may also be as high as at least 70%, 80%, 90%, or 95% by weight. The char yield of a potential compound may be determined by comparing the weight of a sample before and after heating to at least 1000° C. for at least 1 hr in an inert atmosphere such as nitrogen or argon. Any such compounds with high char yields may be used as the charring may play a role in the mechanism of the reactions. This char yield may be measured at an elevated (e.g. above atmospheric) pressure to be used when a heating step is also performed at such pressure. Thus, a compound having a low char yield at atmospheric pressure but having a high char yield under external pressure or the conditions that the disclosed methods are performed may be suitable for producing silicon carbides and silicon nitrides.

Certain organic compounds may exhibit any of the following characteristics, including mutually consistent combinations of characteristics: containing only carbon and hydrogen; containing aromatic and acetylene groups; containing only carbon, hydrogen, and nitrogen; containing no oxygen; and containing a heteroatom other than oxygen. It may have a melting point of at most 400° C., 350° C., 300°

C., 250° C., 200° C. or 150° C. and the melting may occur before polymerization or degradation of the compound or it may be a liquid. Examples of organic compounds include, but are not limited to, 1,2,4,5-tetrakis(phenylethynyl)benzene (TPEB), 4,4'-diethynylbiphenyl (DEBP), N,N'-(1,4-phenylenedimethylidyne)-bis(3-ethynylaniline) (PDEA), N,N'-(1,4-phenylenedimethylidyne)-bis(3,4-dicyanoaniline) (dianilphthalonitrile), and 1,3-bis(3,4-dicyanophenoxy)benzene (resorcinol phthalonitrile) or a prepolymer thereof. More than one organic compound may be used. Prepolymers may also be used, such as a prepolymer of TPEB or other suitable organic compounds. Different compounds can be blended together and/or reacted to a prepolymer stage before usage as the organic compound of the precursor composition. The presence of nitrogen atoms in the organic compound may produce metal nitrides in the ceramic without the use of a nitrogen atmosphere.

An optional component in the precursor materials is a plurality of fibers or other fillers. Examples of fibers include, but are not limited to, carbon fibers, ceramic fibers, and metal fibers. The fibers may be of any dimension that can be incorporated into the mixture and may be cut or chopped to shorter dimensions.

Another optional component is boron for formation of silicon boron carbide nanoparticles. Suitable boron is readily available in powder form. A 95-97% boron is suitable with a higher purity boron powder (99%) being preferred. The boron powder may be milled to reduce its particle size. The boron may be used in any way disclosed in U.S. Pat. Nos. 8,822,023 and 8,865,301.

Also, the precursor mixture, including any fibers, may be formed into a shaped component. The component may be shaped and/or heated under pressure, removed from the pressure, and heated to thermoset and ceramic components as described below. The precursor composition may also be milled.

The precursor mixture, which may be mixed in a melt stage, then undergoes a heating step to form a thermoset composition. This may be performed while the mixture is in a mold. This will allow the final product to have the same shape as the mold, as the organic component of the mixture will melt if not already liquid and the mixture will fill the mold during the heating, and retain its shape when the ceramic is formed. The precursor mixture is heated in an inert atmosphere or vacuum at a temperature that causes polymerization of the organic compound to a thermoset. If the organic compound is volatile, the heating may be performed under pressure, either physical or gas pressure, to avoid evaporation of the organic compound. Suitable heating temperatures include, but are not limited to, 150-500° C. or 700° C.

Heating the precursor may also cause the polymerization of the organic compound to a thermoset. The silicon and metal particles 10 would then be dispersed throughout the thermoset 20 as shown in FIG. 2. A thermoset having the particles dispersed throughout may be used as a final product. The thermoset may also be machined to a desired shape, followed by heating to form a ceramic as described below.

The silicon and metal may be homogeneously distributed or embedded in the thermoset as an intermediate shaped solid. At this stage, the composition may have a shape that it will retain upon further heating and conversion to the ceramic from reaction of the silicon with the developing carbon matrix.

The precursor mixture may be consolidated to a shaped solid component under pressure to promote intimate contact of the reactants to provide a very dense ceramic solid or to densify the final product. The precursor mixture may be compacted under exterior pressure, removed from the pressure, and then heated to a thermoset followed by conversion to the ceramic. Alternatively, the precursor mixture may be compacted under exterior pressure and the pressure maintained while heating to the thermoset and ceramic.

Optionally, the thermoset composition may be heated between 600 to 1400° C. The upper end of the range approaches the melting point of silicon. These temperatures may produce carbonization of the organic precursor to produce a metal-silicon-carbon composition in which the metal and silicon are embedded in the carbon waiting to react at or above the melting point of the silicon.

In a second heating step, the thermoset composition is heated to form a ceramic. The heating is performed at a temperature that causes formation of nanoparticles of metal silicide 60 in a carbonaceous matrix or silicon matrix 70 (FIG. 4). Metal carbide and silicon carbide particles may also be formed. The carbonaceous matrix may comprise graphitic carbon, carbon nanotubes, and/or amorphous carbon. If nitrogen is present, metal nitride nanoparticles may be formed. There may be a higher concentration of nitrides on the surface than in the interior. Suitable heating temperatures include, but are not limited to, 500-1900° C. If boron is present, then silicon boron carbide or metal boride nanoparticles may be formed.

The presence and composition of the nanoparticles may be verified by any known technique for detecting nanoparticles such as SEM, TEM, or XRD. The nanoparticles may have an average diameter of less than 100 nm, 50 nm, or 30 nm. They may be generally spherical in shape or may be non-spherical, such as nanorods or other nanostructures. As used herein, the term "nanoparticle" also includes nanocrystallites, and may include particles larger than 100 nm or larger than 1 micron, or up to 10 microns in diameter.

The ceramic may include any amount of nanoparticles and/or nanorods, including but not limited to, at least 5%, 10%, 20%, 30%, 40%, 50%, 60%, 70%, 80%, 90%, 95%, or 99% by weight of nanoparticles. The percentage of nanoparticles and/or nanorods may be in part determined by the molar ratio of metal, silicon, and carbon atoms in the precursor mixture.

The ceramic is not formed as a powder and may be in the form of a solid, unbroken mass. It may contain less than 20% by volume of voids or as low as 10%, 5%, or 1%. It may have the same shape as the precursor mixture (if solid) or it may take on the shape of a mold it was placed in during the heating. The ceramic may retain its shape in that it does not crumble when handled and may not change shape or break without the use of extreme force. The ceramic composition may be tough, hard, and have structural integrity. The degree of such properties may depend on the amount of ceramic to carbon in the solid ceramic composition. Any shape may be formed to make an article useful for incorporation into an apparatus. The article may be large enough to have a minimum size of at least 1 cm in all dimensions. That is, the entire surface of the article is at least 5 mm from the center of mass of the article. Larger articles may be made, such as having a minimum size of at least 10 cm in all dimensions. Also, the composition may have smaller sizes, such as 1 mm, 2 mm, or 5 mm.

Potential advantages may include the following. 1) The reaction is performed in situ in one step in any solid shape, form, or film desired. 2) Regardless of the ratio of metal compound and silicon powder to carbon source, the metal silicide and carbide form as nanoparticles: this is a highly desirable result, as it is generally accepted that homogeneous nanoparticle composites of ceramics will have better properties than their much more common microparticle counterparts. 3) The temperatures at which the synthetic process occurs is well below those normally associated with the formation of silicide- and carbide-based ceramics. 4) By its very nature, the method permits the silicide and/or silicide-carbide-carbon composites to be easily shaped by liquid molding procedures (injection pressure molding, vacuum molding, spreading, etc.), which is a far less costly and involved process than machining a hot press sintered powdered material. 5) The native presence of an "elastic" carbon matrix allows for toughening of the inherently brittle sintered ceramics. The carbon permits operation of the toughened ceramic at extremely high temperatures, owing to carbon's high melting point (>3000° C.). Ceramic/carbon-matrix compositions are currently sought for these reasons, and the present invention permits straightforward preparation of these composites in a single step for the first time, in contrast to the traditional means of first forming the ceramic powder and then preparing the ceramic shaped solid composition under sintering conditions. Also, the ratio of ceramic to carbon is easily tuned based only on the ratio of metal-compound to carbon-precursor. 6) The precursor composition containing the carbon precursor (for example, TPEB) can be deployed as a thin film by 3D printings and the formulation of circuits. 7) Fiber reinforced ceramic nanoparticle composite can be readily fabrication by the method of this invention with the presence of the carbon precursor the key.

Carbon fiber-reinforced refractory metal silicides-carbon matrix composites or metal silicide, metal carbide, silicon carbide, and/or carbon-matrix composites may exhibit outstanding mechanical properties for usage under extreme environmental high temperature conditions; these materials do not currently exist. Finely divided fiber reinforced refractory metal silicide ceramic-carbon composites allow the consolidation of fully dense shaped solid components with extreme fracture resistance for uses in high stress and temperature applications such as advanced engine components for hypersonic vehicles and automobiles, where increased operation temperature and mechanical integrity could translate into tremendous economic advantages. Such tough, easily shaped ceramic composites are critical to the next generation of jet engines, which are being designed to operate at higher internal temperatures and stresses than those in current service, and in advanced automobile engines and supporting components. The rails of a railgun would be improved with hard, high-temperature, conductive ceramic coatings. In addition, high temperature ship deck plates could be readily fabricated for aircraft carriers needing the superior heat resistant properties of the metal silicides-carbon matrix composites or metal silicide, metal carbide, silicon carbide, and/or carbon-matrix composites. The ability to fabricate tough, shaped refractory metal silicides-carbon matrix composites or metal silicide, metal carbide, silicon carbide, and/or carbon-matrix composites in one step enhances their importance due to the economic advantages and the elimination of sintering of the respective powders at high temperature and pressure machining to a shaped component.

The following examples are given to illustrate specific applications. These specific examples are not intended to limit the scope of the disclosure in this application.

EXAMPLE 1

Formulation of precursor composition of TPEB, titanium hydride, and silicon powder (1 to 5 μm particle size) in 0.003 to 1 to 1.9 molar ratios—TPEB (28 mg, 0.06 mmol), titanium hydride (1.00 g, 20.0 mmol), and silicon powder (1 to 5 μm particle size) (1.07 g, 38.1 mmol) were thoroughly mixed and used as the precursor composition for the formation of titanium silicide nanoparticles/nanostructures embedded in a matrix of carbon or silicon carbide that behaves as a matrix material. The ratio of the three reactants can be readily varied by the described formulation method.

EXAMPLE 2

Conversion of precursor composition of TPEB, titanium hydride and silicon powder (1 to 5 μm particle size) in 0.003 to 1 to 1.9 molar ratios to polymeric thermoset solid in an argon atmosphere—A sample (100 mg) of the precursor composition of Example 1 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 3

Conversion of polymeric thermoset solid to shaped titanium silicide-carbide matrix solid ceramic composition by heating to 1500° C. under an argon atmosphere—The solid polymeric thermoset of Example 2 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 93% of the original weight. XRD analysis showed the formation of pure titanium silicide nanoparticles/nanostructures embedded in a matrix of carbon and/or silicon carbide.

EXAMPLE 4

Formulation of precursor composition of TPEB, titanium hydride and silicon powder (1 to 5 μm particle size) in 0.03 to 1 to 1 molar ratios—TPEB (282 mg, 0.59 mmol), titanium hydride (1.00 g, 20.0 mmol) and silicon powder (1 to 5 μm particle size) (0.560 g, 20.0 mmol) were thoroughly mixed and used as the precursor composition for the formation of titanium silicide nanoparticles/nanostructures embedded in a matrix of carbon or silicon carbide that behaves as a matrix material. The ratio of the three reactants can be readily varied by the described formulation method.

EXAMPLE 5

Conversion of precursor composition of TPEB, titanium hydride and silicon powder (1 to 5 μm particle size) in 0.03 to 1 to 1 molar ratios to polymeric thermoset solid in an argon atmosphere—A sample (100 mg) of the precursor composition of Example 4 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 6

Conversion of polymeric thermoset solid to shaped titanium silicide-carbide matrix solid ceramic composition by heating to 1500° C. under an argon atmosphere—The solid polymeric thermoset of Example 5 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 93% of the original weight. XRD analysis showed the formation of pure titanium silicide nanoparticles/nanostructures embedded in a matrix of carbon and/or silicon carbide.

EXAMPLE 7

Formulation of precursor composition of TPEB, zirconium hydride and silicon powder (1 to 5 µm particle size) in 0.03 to 1 to 1.9 molar ratios—TPEB (15 mg; 0.03 mmol), zirconium hydride (1.00 g, 10.7 mmol) and silicon powder (1 to 5 µm particle size) (0.570 g, 20.3 mmol) were thoroughly mixed and used as the precursor composition for the formation of zirconium silicide nanoparticles/nanostructures embedded in a matrix of carbon or silicon carbide that behaves as a matrix material. The ratio of the three reactants can be readily varied by the described formulation method.

EXAMPLE 8

Conversion of precursor composition of TPEB, zirconium hydride and silicon powder (1 to 5 µm particle size) in 0.03 to 1 to 1.9 molar ratios to polymeric thermoset solid in an argon atmosphere—A sample (125 mg) of the precursor composition of Example 7 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 9

Figure 5:
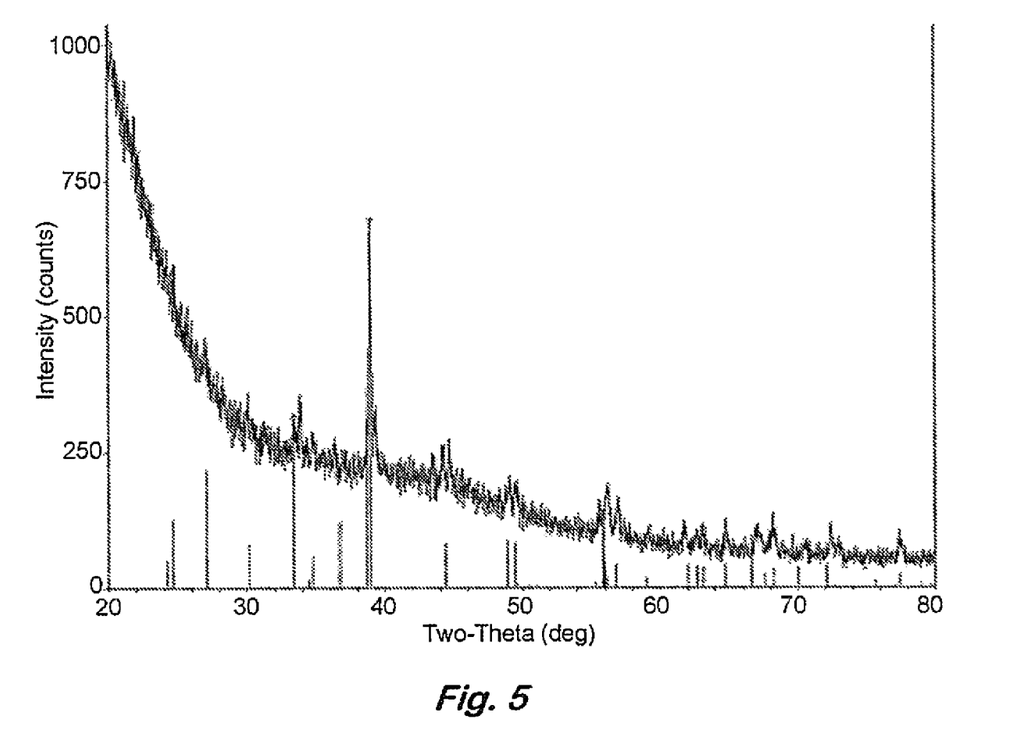
FIG. 5 shows an X-ray diffraction analysis (XRD) of a sample containing $ZrSi_2$ nanoparticles in a silicon matrix.

Conversion of polymeric thermoset solid to shaped zirconium silicide-carbide matrix solid ceramic composition by heating to 1500° C. under an argon atmosphere—The solid polymeric thermoset of Example 8 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 93% of the original weight. XRD analysis (FIG. 5) showed the formation of pure zirconium silicide nanoparticles/nanostructures with an average crystallite size of 10 nm embedded in a matrix of carbon and/or silicon carbide.

EXAMPLE 10

Formulation of precursor composition of TPEB, hafnium hydride and silicon powder (1 to 5 µm particle size) in 0.003 to 1 to 1.9 molar ratios—TPEB (8 mg; 0.02 mmol), hafnium hydride (1.00 g, 5.54 mmol) and silicon powder (1 to 5 µm particle size) (0.296 g, 10.5 mmol) were thoroughly mixed and used as the precursor composition for the formation of hafnium silicide nanoparticles/nanostructures embedded in a matrix of carbon or silicon carbide that behaves as a matrix material. The ratio of the three reactants can be readily varied by the described formulation method.

EXAMPLE 11

Conversion of precursor composition of TPEB, hafnium hydride and silicon powder (1 to 5 µm particle size) in 0.003 to 1 to 1.9 molar ratios to polymeric thermoset solid in an argon atmosphere—A sample (155 mg) of the precursor composition of Example 10 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 12

Conversion of polymeric thermoset solid to shaped hafnium silicide-carbide matrix solid ceramic composition by heating to 1500° C. under an argon atmosphere—The solid polymeric thermoset of Example 11 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 92% of the original weight. XRD analysis showed the formation of pure hafnium silicide nanoparticles/nanostructures embedded in a matrix of carbon and/or silicon carbide.

EXAMPLE 13

Formulation of precursor composition of TPEB, molybdenum metal and silicon powder (1 to 5 µm particle size) in 0.006 to 1 to 1.8 molar ratios—TPEB (30 mg; 0.06 mmol), molybdenum metal (1.00 g, 10.4 mmol) and silicon powder (1 to 5 µm particle size) (0.527 g, 18.7 mmol) were thoroughly mixed and used as the precursor composition for the formation of molybdenum silicide nanoparticles/nanostructures embedded in a matrix of carbon or silicon carbide that behaves as a matrix material. The ratio of the three reactants can be readily varied by the described formulation method.

EXAMPLE 14

Conversion of precursor composition of TPEB), molybdenum metal and silicon powder (1 to 5 µm particle size) in 0.2 to 1 to 1.8 molar ratios to polymeric thermoset solid in an argon atmosphere—A sample (155 mg) of the precursor composition of Example 13 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 15

Conversion of polymeric thermoset solid to shaped molybdenum silicide-carbide matrix solid ceramic composition by heating to 1500° C. under an argon atmosphere—The solid polymeric thermoset of Example 14 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 95% of the original weight. XRD analysis showed the formation of pure molybdenum silicide nanoparticles/nanostructures embedded in a matrix of carbon or silicon carbide.

EXAMPLE 16

Formulation of precursor composition of TPEB, molybdenum metal, titanium hydride, and silicon powder (1 to 5

μm particle size) in 0.006 to 0.5 to 0.5 to 1.8 molar ratios—TPEB (30 mg; 0.06 mmol), molybdenum metal (0.50 g, 5.21 mmol), titanium hydride (0.26 g, 5.21 mmol) and silicon powder (1 to 5 μm particle size) (0.527 g, 18.7 mmol) were thoroughly mixed and used as the precursor composition for the formation of molybdenum silicide/titanium silicide nanoparticles/nanostructures embedded in a matrix of carbon and/or silicon carbide that behaves as a matrix material. The ratio of the three reactants can be readily varied by the described formulation method.

EXAMPLE 17

Conversion of precursor composition of TPEB, molybdenum metal, titanium hydride, and silicon powder (1 to 5 μm particle size) in 0.2 to 0.5 to 0.5 to 1.8 molar ratios to polymeric thermoset solid in an argon atmosphere—A sample (155 mg) of the precursor composition of Example 16 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 18

Figure 6:
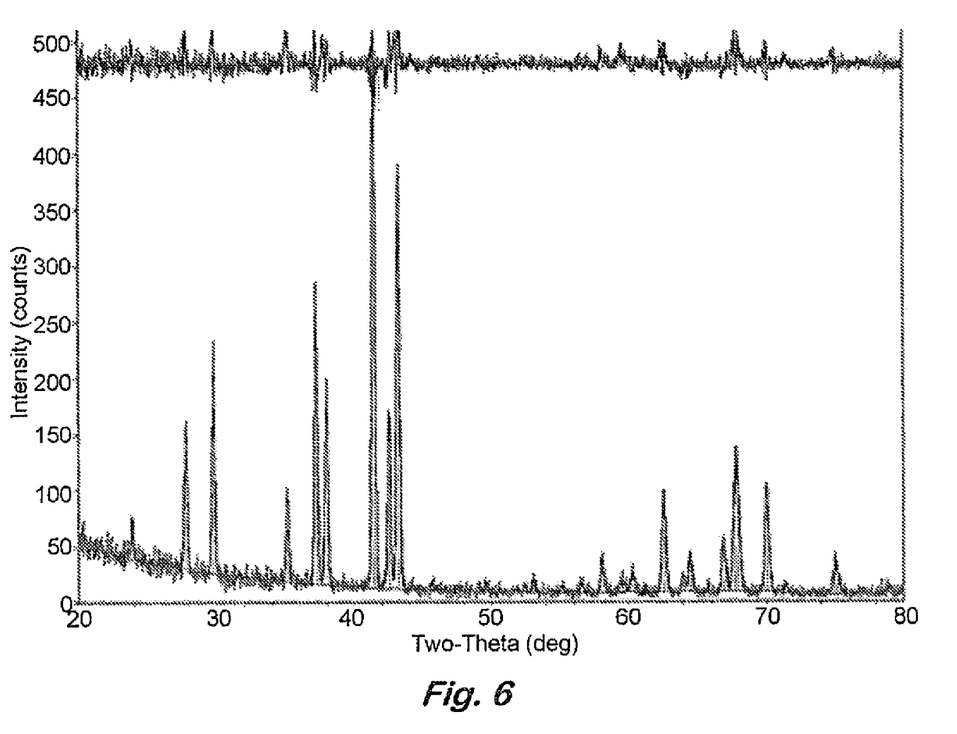
FIG. 6 shows an XRD of a sample containing $TiMoSi_2$ nanoparticles in a silicon matrix.

Conversion of polymeric thermoset solid to shaped molybdenum/titanium silicide-carbide matrix solid ceramic composition by heating to 1500° C. under an argon atmosphere—The solid polymeric thermoset of Example 17 was heated under a flow (110 cc/min) of argon at 3° C./min to 1200° C. and held at this temperature for 1 min followed by heating at 1° C./min to 1415° C. and holding at this temperature for 1 hr and at 1° C./min to 1500° C. and holding at this temperature for 1 hr. The resulting solid ceramic sample retained 95% of the original weight. XRD analysis (FIG. 6) showed the formation of pure molybdenum silicide/titanium silicide nanoparticles/nanostructures with an average crystallite size of 95 nm embedded in a matrix of carbon and/or silicon carbide.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
a metal component selected from:
 particles of a refractory metal; and
 a refractory-metal compound capable of decomposing into refractory-metal nanoparticles;
elemental silicon; and
an organic component selected from:
 an organic compound having a char yield of at least 60% by weight; and
 a thermoset made from the organic compound.

2. The composition of claim 1, wherein the refractory metal is titanium, zirconium, hafnium, molybdenum, tungsten, niobium, tantalum, or vanadium.

3. The composition of claim 1, wherein the metal component is a salt, a hydride, a carbonyl compound, a halide, or particles of the refractory metal.

4. The composition of claim 1, wherein the organic compound:
contains only carbon and hydrogen;
contains aromatic and acetylene groups;
contains only carbon, hydrogen, and nitrogen;
contains no oxygen; or
contains a heteroatom other than oxygen.

5. The composition of claim 1, wherein the organic compound is 1,2,4,5-tetrakis(phenylethynyl)benzene or a prepolymer thereof.

6. The composition of claim 1, wherein the composition is milled.

7. A method comprising:
combining particles of a refractory metal or a refractory-metal compound capable of decomposing or reacting into refractory-metal nanoparticles, elemental silicon, and an organic compound having a char yield of at least 60% by weight to form a precursor mixture.

8. The method of claim 7, further comprising:
milling the precursor mixture.

9. The method of claim 7, further comprising:
placing the precursor mixture into a mold or shaped reactor.

10. The method of claim 7, further comprising:
heating the precursor mixture in an inert atmosphere or vacuum at a temperature that causes decomposition or reaction of the refractory-metal compound or particles to form refractory-metal nanoparticles to form a metal nanoparticle composition.

11. The method of claim 10, wherein heating the precursor mixture causes polymerization of the organic compound to a thermoset.

12. The method of claim 10, further comprising:
heating the metal nanoparticle composition in an inert atmosphere or vacuum at a temperature that causes formation of a ceramic comprising nanoparticles of a refractory-metal silicide in a carbonaceous matrix.

13. The method of claim 12, wherein heating the metal nanoparticle composition causes formation of nanoparticles comprising a carbide of the refractory metal, a nitride of the refractory metal, or silicon carbide.

14. A method comprising:
providing a precursor mixture of particles of a refractory metal or a refractory-metal compound capable of decomposing into refractory-metal nanoparticles, elemental silicon, and an organic compound;
heating the precursor mixture in a first inert atmosphere at an elevated pressure at a temperature that causes decomposition of the refractory-metal compound to form refractory-metal nanoparticles to form a metal nanoparticle composition; and
heating the metal nanoparticle composition in a second inert atmosphere or vacuum at a temperature that causes formation of a ceramic comprising nanoparticles of a refractory-metal silicide in a carbonaceous matrix;
wherein the organic compound has a char yield of at least 60% by weight when heated at the elevated pressure.

15. The method of claim 12, wherein the inert atmosphere is argon or nitrogen.

16. The method of claim 14, wherein the first inert atmosphere or the second inert atmosphere is argon or nitrogen.

17. The composition of claim 1, wherein the metal component is the refractory-metal compound capable of decomposing into refractory-metal nanoparticles.

18. The method of claim 12, wherein the precursor mixture comprises the refractory-metal compound capable of decomposing into refractory-metal nanoparticles.

19. The method of claim 14, wherein the precursor mixture comprises the refractory-metal compound capable of decomposing into refractory-metal nanoparticles.

* * * * *